Figure 1:
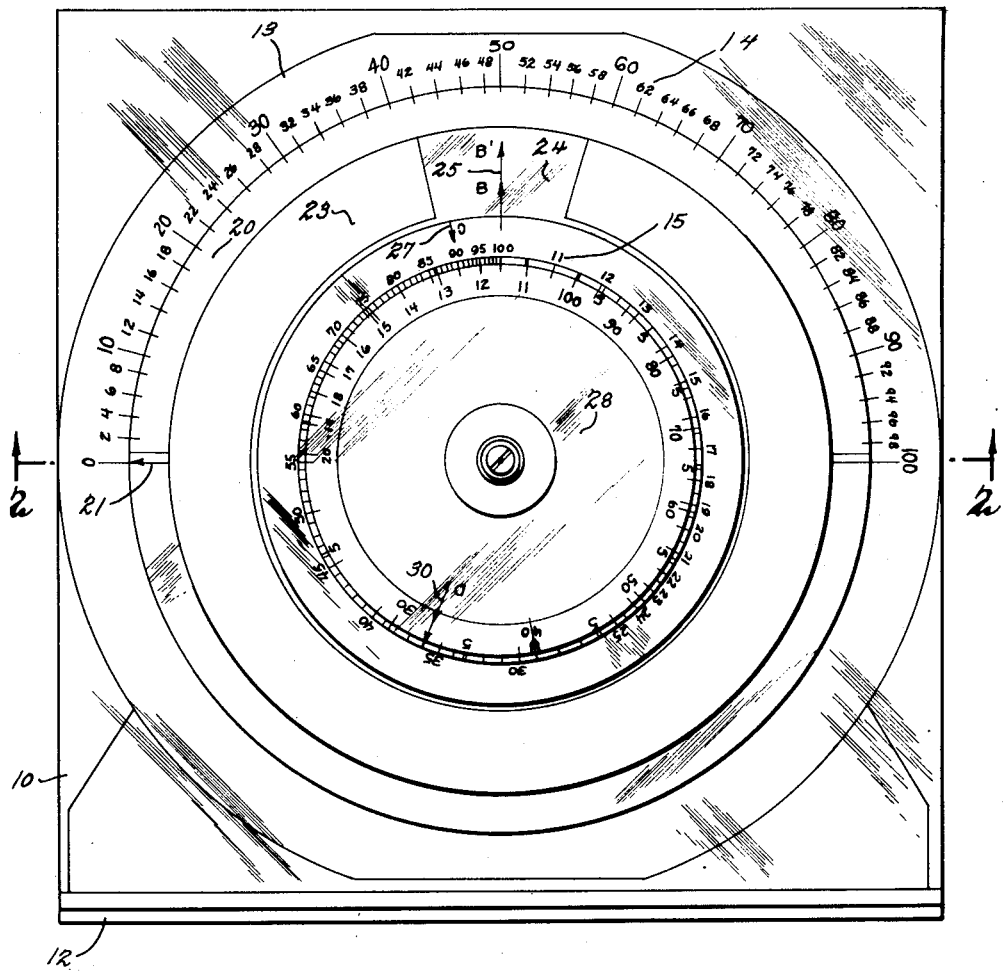

May 29, 1951 W. H. RAYMOND ET AL 2,555,293
PERCENTAGE AND PROFIT COMPUTER
Filed Dec. 1, 1948 3 Sheets-Sheet 1

INVENTOR.
Winthrop H. Raymond
Wallace H. Harper
By Wilkinson & Mawhinney
ATTORNEYS May 29, 1951 W. H. RAYMOND ET AL 2,555,293
PERCENTAGE AND PROFIT COMPUTER
Filed Dec. 1, 1948 3 Sheets-Sheet 2

INVENTOR.
Winthrop H. Raymond
Wallace H. Harper
By Wilkinson & Mawhinney
ATTORNEYS May 29, 1951  W. H. RAYMOND ET AL  2,555,293
PERCENTAGE AND PROFIT COMPUTER
Filed Dec. 1, 1948  3 Sheets-Sheet 3
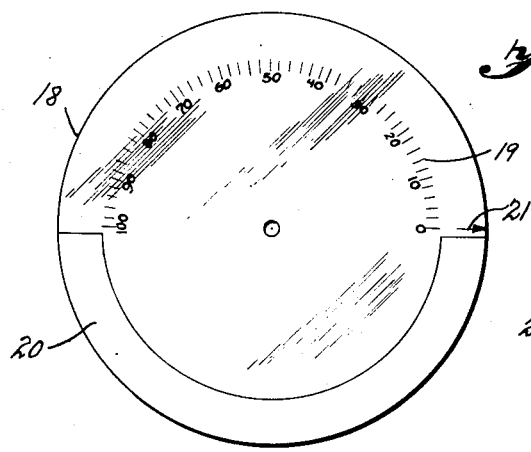
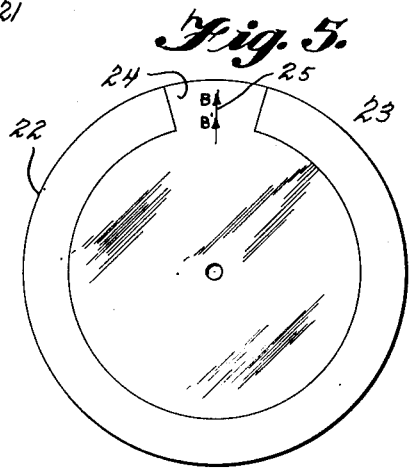
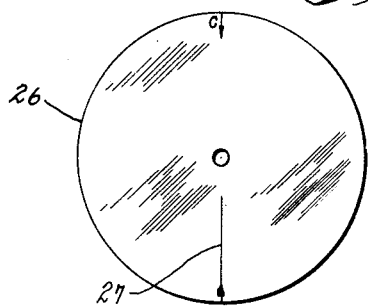
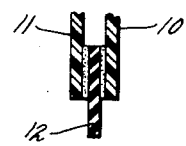
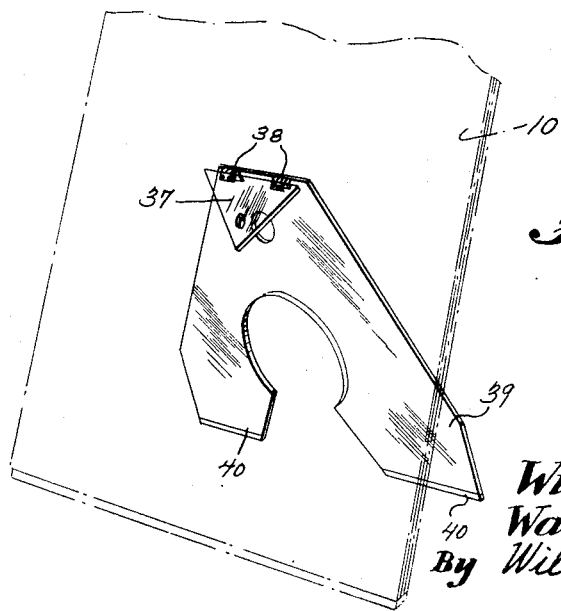
INVENTOR.
Winthrop H. Raymond
Wallace H. Harper
By Wilkinson & Mawhinney
ATTORNEYS Patented May 29, 1951

2,555,293

UNITED STATES PATENT OFFICE 2,555,293

PERCENTAGE AND PROFIT COMPUTER

Winthrop H. Raymond and Wallace H. Harper, Lewistown, Mont., assignors to Charles W. Cooley, Lewistown, Mont.

Application December 1, 1948, Serial No. 62,906

4 Claims. (Cl. 235—84)

The present invention relates to improvements in percentage and profit computers and has for an object the provision of such an instrument with the rapid calculation of percentages, particularly, the ratio of gross profits to sales, can be effected. The instrument is also so constructed that the resultant factor between gross profits on sales and operating expenses, as net profits or losses, is indicated thereon.

Another object of the present invention is to provide a device of this character on which the operator can mark progress, over a period of time, toward a "break-even" point, as gross profits are accumulated to overcome fixed expenses; can portray the performance of any department of a business, or a business as a whole, against previously assigned quotas or forecast sales volume.

The present invention contemplates the provision of an improved computer comprising component parts on which logarithmic graduations of the numbers from ten to one hundred are made and by which the rapid calculations of percentages is effected in that the number of manual operations required to obtain correct results are reduced from one to several over the prior art structures.

In all its operations this improved instrument retains in full view on the faces of the several disks all factors which make up the problem to be solved. For example, when a percentage is determined, the three factors of base, rate and percentage are clearly visible on the disks at the conclusion of the operations resulting in finding the solution. No one of the three factors involved in such a problem is removed from the face of the disks at any time during the operations required to obtain the answer so that the mind of the operator is not taxed beyond carrying the number of decimal places which are required to work the problem at hand. These desirable features make possible simplicity of operation, ease in handling and encourage more general use.

With the foregoing and other objects in view, the invention will be hereinafter more fully described and more particularly pointed out in the appended claims.

Figure 2:
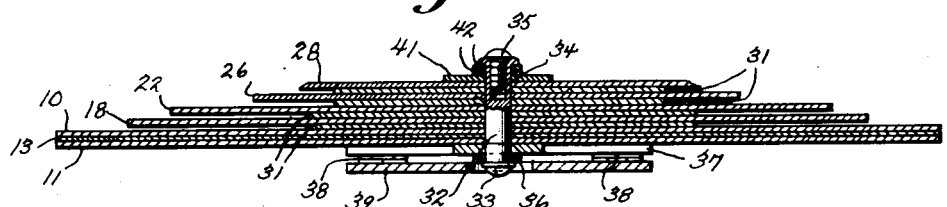
Figures 3, 7:
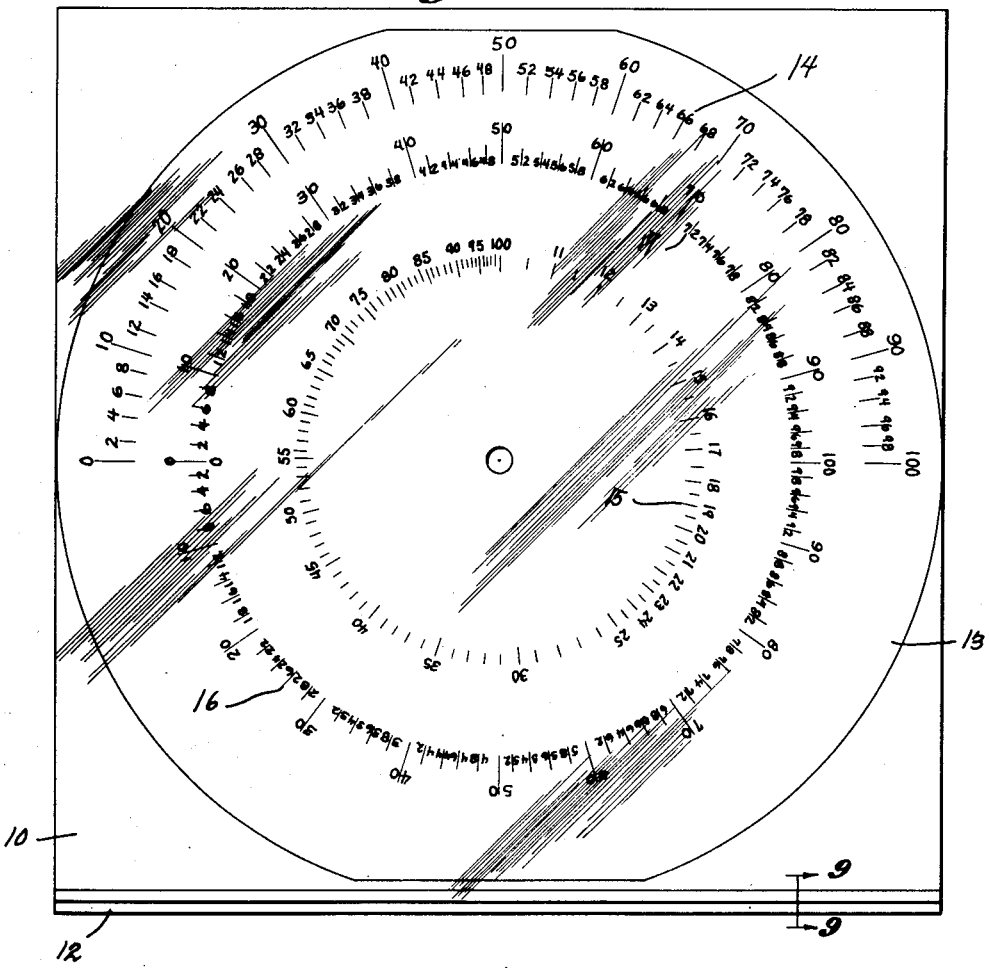

In the drawings, in which the same parts are denoted by the same reference numerals throughout the several views, Figure 1 is a top plan view of the improved device constructed in accordance with the present invention, Figure 2 is a sectional view taken on the line 2—2 of Figure 1, Figure 3 is a top plan view of the base, Figure 4 is a top plan view of the masking disk, Figure 5 is a top plan view of the viewing disk, Figure 6 is a top plan view of the indicating disk, Figure 7 is a top plan view of the logarithmic disk, Figure 8 is a perspective view of the easel showing the base in phantom lines, and Figure 9 is a sectional view taken on the line 9—9 of Figure 3.

Referring more particularly to the drawing, 10 and 11 indicate a pair of plates of transparent plastic, such as Plexiglas, which comprise a base. Each of the plates 10 and 11 is substantially twelve inches square and are not attached to one another except along their bottom edge portions where they are joined together by a strip 12 of resilient material, such as rubber, which is disposed between the plates and is secured to their inner opposed faces by glue or the like. A portion of the strip 12 projects beyond the bottom edges of the plates 10 and 11 to provide a non-scratching support for the base for engagement with a desk or other suitable supporting surface.

A stationary base disk 13 is disposed between the plates 10 and 11 and can be made of any suitable material, such as, white Bristol board, with a diameter of about twelve inches. The base disk 13 has an outer semicircle of numerical markings 14 located thereon at about five inches from the center of the disk. These markings begin with zero at the left center of the disk and continue by twos on the five inch radius in a clockwise direction to one hundred at the right center of the disk. The markings or graduations of the scale 14 are equally spaced graduations from 1 to 100 and may include as many calibrated subdivisions thereof as space will permit for accurate reading at normal reading range. The base disk has an inner complete circle of markings 15 beginning at the upper center of the dial at about three inches from the center thereof. These markings begin with one hundred and continue with logarithmically determined space intervals in a counterclockwise direction on the three inch radius and terminate with ten.

The markings 14 and 15 are in black figures. The base disk 13 has a complete circle of graduations which is disposed between the inner and outer markings 14 and 15 on a radius of about four and one-half inches from the center of the disk. This intermediate circle of markings comprises a half-circle of markings 16 in red figures beginning at the right center of the disk with one hundred and continuing by twos in a clockwise direction with equally spaced graduations and ending with zero at the left center of the base disk and a half-circle of markings 17 in black figures beginning at the red zero with zero and continuing by twos in a clockwise direction with equally spaced graduations and ending with 100 in overlapping relation to the red one hundred.

A masking disk 18 of transparent plastic, such as Plexiglas, is superimposed upon the base plate 10 and has a diameter of approximately ten inches. The disk 18 has a half-circle of figures 19 which are disposed on a radius approximately four and one-fourth inches from the center of the disk beginning with one hundred and continuing by twos in a clockwise direction with equally spaced apart figures and ending with zero. The disk 18 has a semicircular blocked-in portion 20 which begins at the figure one hundred and continues in a counterclockwise direction to terminate at the zero marking.

This blocked-in portion begins at the periphery of the disk 18 and extends inwardly therefrom for a distance of about one inch and selectively masks portions of the intermediate graduations on the base disk 13. The blocked-in portion can be formed by applying white enamel to the under surface of the disk 18. The disk 18 is provided with an arrow 21 which extends from the zero marking to the edge of the disk with the head of the arrow pointing toward the edge of the disk.

A viewing disk 22 of transparent plastic, such as Plexiglas, is superimposed upon the disk 18 and has a diameter of approximately eight inches. The disk 22 has a blocked-in border portion 23 which extends around the edge portion of the disk with the exception of a space 24 approximately thirty degrees wide which provides a viewing window. The blocked-in border can be made by applying white enamel to the under surface of the disk 22 and is approximately one inch wide and selectively masks portions of the intermediate graduations on the base disk 13 and the figures 19 on the disk 18. A two headed arrow 25 is disposed upon the disk 22 at approximately the center of the space 24. The shaft of the arrow extends for about one inch toward the center of the disk.

An indicating disk 26 of transparent plastic, such as Plexiglas, is superimposed upon the disk 22 and has a diameter of approximately six inches. The disk 26 has an arrow 27, the shaft of which extends from one edge of the disk towards the center thereof for a distance of about two inches and the head of which appears near the opposite edge of the disk.

A logarithmic disk 28 of transparent plastic, such as Plexiglas, is superimposed upon the disk 26 and has a diameter of approximately five inches. The disk 28 has a complete circle of black figures 29 on a radius of about two inches from the center thereof. The figures begin with one hundred and continue in a clockwise direction to ten and are logarithmically graduated and inverted with relation to the logarithmic graduations on the base disk 13. An arrowhead 30 is disposed on the disk 28 at a point which is diametrically opposite to the one hundred marking. The disk 28 can be beveled on its edge.

Washers 31 of suitable material are interposed between the various adjacent disks for facilitating the rotation of the disks with respect to one another without scratching the surfaces thereof. Suitable alined openings are provided in the several disks and in the plates 10 and 11 for the reception of a pivot member comprising a screw 32 having at one end a head 33 provided with a kerf therein and an internally threaded socket 34 at its opposite end for the reception of a screw 35. A pair of cup shaped washers 36 are interposed between the head 33 of the screw 32 and a substantially triangularly shaped plate 37 to which is movably connected by hinges 38 a substantially A-shaped supporting member 39. Resilient strips 40 are secured by adhesive or the like to the lower edge of the legs of the A-shaped member 39. The triangular plate 37 is disposed between the washers 31 and the rear surface of the base plate 11. A disk washer 41 is superimposed upon the disk 28 around the screw 32. Washers 42 are disposed between the disk washer 41 and the head of the screw 35. This arrangement maintains the disks in proper superimposed relation and at the same time permits relative rotation between the several disks.

The operation of the improved computer will be understood from the following examples of problems and explanations of their solutions with this device.

Figure 1 of the drawing illustrates the relative positions of the several disks in setting up and solving Examples 1, 2 and 3.

*Example 1.—Determine what 40% of 90 is*

With one hand operating the disks, turn disk 26 to the figure 90 showing on the logarithmic scale 15 marked on the Bristol board 13, and which shows through the Plexiglas disks; then turn disk 28 so that the shaft of the arrow 27 on disk 26 which appears therein blends with the 40 marking on disk 28. The result, 36, on the stationary logarithmic scale 15, is indicated where the arrowhead 30 on disk 28 points. The three factors base, rate, and percentage are all in view of the operator.

*Example 2.—Determine what percentage 36 is of 90*

Turn disk 26 to the figure 90 which appears on the stationary logarithmic scale 15 of base disk 13, then turn disk 28 so that the arrowhead 30 thereon points to 36 on the stationary logarithmic scale 15, and off the shaft of the arrow 27 on disk 26 read the percentage 40% on disk 28.

*Example 3.—What is the base if the rate is 40% and the percentage is 36?*

Turn disk 26 so that the shaft of the arrow 27 thereon blends with the marking at 40 on disk 28, then turn disk 26 so that the arrowhead 30 on disk 28 points to 36 on the stationary logarithmic scale 15. The answer or base 90 on the scale 15 is read opposite the arrowhead on disk 26. Turning disk 26 causes the arrow 30 on disk 28, with particular reference to the sample problem offered, to point to 36 on the scale 15, by reason of the reference line 27, which is otherwise described or defined as the shaft of arrow 27, being brought to blend with, or superimpose directly over, the factor of rate, i. e., 40, marked on said disk 28. The indication of 36 is automatic thereby, 36 being 40% of 90.

For the purpose of further explanation of the operation of the device the following examples are described:

*Example 4.—The determination of net profit of an operation if the gross profit is in the amount of $6,000.00 and the operating expense is in the amount of $4,500.00*

With one hand operating the disks, turn disk 18 so that the arrowhead 21 thereon points to 60 of the markings 14 on the base disk 13, then turn disk 22 so that the arrowhead 25 thereon points to 45 as read off the markings 19 on disk 18. This arrowhead 25 will further point to the figure 15 in black on the intermediate half-circle 17 on disk 13. By adding the necessary decimal places the amount $1,500.00 is determined to be net profit.

If the operating expenses in Example 4 above were $7,000.00, by following the instructions under Example 4, the net profit will be read as $1,000.00 which is, of course, a net loss and which will appear where the arrowhead on disk 22 further points on the red half-circle 16 of disk 13.

*Example 5.—Marking progress toward pre-assigned sales or gross profit quotas*

Turn disk 22 so that the arrowhead 25 thereon points to the figure 10 on disk 18, representing the pre-assigned quota of $10,000.00, turn disk 18 and disk 22 so that the arrowhead 21 which appears thereon points to 0 as appears on the outer ring of black figures 14 on the disk 13 to make a point of beginning. As sales, for example $5,000.00, are accumulated over a period of time, turn disk 18 and disk 22 so that the arrow 21 points to 5 on outer circle 14 of disk 13, the amount of accumulated sales. The arrowhead 25 on disk 22 will further point to red 5 on the intermediate circle 16 of the disk 13, the amount of the quota remaining to be made, namely $5,000.00. In this manner the three factors of pre-assigned quotas, actual sales made, and sales remaining to be made, are visible records. The percentage of sales made to sales quotas can be easily determined by the operation of the two smaller disks as before explained.

It will be noted that the blocked-in portion 20 of the masking disk 18 begins adjacent to the arrow 21 so that the chances of error in taking readings off arrow 21 are reduced to a minimum. The blocked-in border 23 of the viewing disk 22 selectively masks nearly all of the markings on disk 18 and the intermediate circle of figures on the base disk 13 and provides a window of relatively small area so that the operator's attention is centered upon the readings involved in the problem at hand.

It is obvious that various changes and modifications may be made in the details of construction and design of the above specifically described embodiment of this invention without departing from the spirit thereof, such changes and modifications being restricted only by the scope of the following claims.

What we claim is:

1. An improved computer comprising a stationary disk having an outer half circle of scale markings thereon beginning with zero and continuing in a clockwise direction to one hundred and a complete circle of scale markings comprising a semi-circle of black figures and a semi-circle of red figures, the semi-circle of red figures beginning with one hundred and continuing in a clockwise direction to zero and the semi-circle of black figures beginning with black zero at the red zero and continuing in a clockwise direction to a black one hundred in overlapping relation to the red one hundred, a rotatable disk associated with said stationary disk and having an arrow thereon directed toward the edge thereof and having a half circle of scale markings beginning with one hundred and continuing in a clockwise direction to zero, a second rotatable disk associated with said first rotatable disk and said stationary disk, and means for interconnecting said disks for relative rotary movement, said rotatable disks being transparent, said first rotatable disk being provided with an opaque semi-circular edge portion which selectively masks portions of the complete circle of scale markings on the stationary disk, said second rotatable disk being provided with an opaque edge portion extending nearly around the entire circumference thereof to provide a window and for selectively masking portions of the complete circle of scale markings on the stationary disk and portions of the scale markings on the first rotatable disk, said second rotatable disk having an arrow on the window thereof pointing toward the scale markings on the other two disks.

2. An improved computer comprising a stationary disk having an outer half circle of scale markings thereon beginning with zero and continuing in a clockwise direction to one hundred and a complete circle of scale markings comprising two semi-circles of figures of contrasting colors, the semi-circle of figures of one color beginning with one hundred and continuing in a clockwise direction to zero and the semi-circle of figures of the other color beginning with zero at the zero of the figures of the said one color and continuing in a clockwise direction to one hundred in overlapping relation to the one hundred of the figures of the said one color, a rotatable disk associated with said stationary disk and having an index thereon directed toward the edge thereof and pointing towards the half circle of scale markings on the stationary disk and having a half circle of scale markings beginning with one hundred and continuing in a clockwise direction to zero, a second rotatable disk associated with said first rotatable disk and said stationary disk, and means for interconnecting said disks for relative rotary movement, said rotatable disks being transparent, said first rotatable disk being provided with an opaque semi-circular edge portion which selectively masks portions of the complete circle of scale markings on the stationary disk, said second rotatable disk being provided with an opaque edge portion extending nearly around the entire circumference thereof for selectively masking portions of the complete circle of scale markings on the stationary disk and portions of the scale markings on the first rotatable disk and to provide a window through which portions of the scale markings of the other two disks can be selectively read, said second rotatable disk having an index on the window thereof pointing toward the scale markings on the other two disks.

3. An improved computer comprising a stationary disk having an outer half circle of scale markings thereon and a complete circle of scale markings comprising two semi-circles of indicia of contrasting colors, the first index of one semi-circle of indicia coinciding with the last index of the other semi-circle of indicia, the last index of the said one semi-circle of indicia coinciding with the first index of the said other semi-circle of indicia, a rotatable disk associated with said stationary disk and having an index thereon directed toward the edge thereof and having a half circle of scale markings thereon, a second rotatable disk associated with said first rotatable disk and said stationary disk, and means for interconnecting said disks for relative rotary movement, said rotatable disks being transparent, said first rotatable disk being provided with an opaque semi-circular edge portion which selectively masks portions of the complete circle of scale markings on the stationary disk, said second rotatable disk being provided with an opaque edge portion extending nearly around the entire circumference thereof for selectively masking portions of the complete circle of scale markings on the stationary disk and portions of the scale markings on the first rotatable disk and to provide a window through which portions of the scale markings of the other two disks can be selectively read, said second rotatable disk having an index on the window thereof and pointing toward the scale markings on the other two disks.

4. An improved computer comprising a stationary disk having a substantially half circle of scale markings thereon and a complete circle of scale markings thereon spaced radially inwardly from the first scale markings, a rotatable transparent disk associated with said stationary disk and having an index thereon directed toward the complete circle of scale markings on the stationary disk and having a substantially half-circle of scale markings thereon, said rotatable disk having an opaque band extending partially around its peripheral edge portion of a radial width sufficient selectively to mask portions of the complete circle of scale markings on the stationary disk, a second rotatable transparent disk associated with the other disks and having an opaque band extending around the major part of its peripheral edge portion, said band having a radial width sufficient to overlie the scale markings of the complete circle on the stationary disk and the scale markings on the first rotatable disk, the opposite ends of said band terminating adjacent one another to provide a window through which portions of the scale markings of the complete circle on the stationary disk and the scale markings on the first rotatable disk may be viewed, said second rotatable disk having an index on the window thereof pointing toward the scale markings on the other two disks.

WINTHROP H. RAYMOND.
WALLACE H. HARPER.

REFERENCES CITED

The following references are of record in the file of this patent:

UNITED STATES PATENTS

| Number | Name | Date |
| --- | --- | --- |
| 573,228 | MacKenzie et al. | Dec. 15, 1896 |
| 629,879 | Sturm | Aug. 1, 1899 |
| 693,774 | Beauregard | Feb. 18, 1902 |
| 753,840 | Barth et al. | Mar. 8, 1904 |
| 922,465 | Fenn | May 25, 1909 |
| 980,867 | Fenn | Jan. 3, 1911 |
| 1,528,869 | Barbieri | Mar. 10, 1925 |
| 1,780,078 | Hite | Oct. 28, 1930 |
| 1,962,866 | Graham | June 12, 1934 |
| 2,177,176 | Gilmore | Oct. 24, 1939 |
| 2,185,677 | Nelson | Jan. 2, 1940 |

OTHER REFERENCES

"Special Slide Rules" by J. N. Arnold, published Sept. 1933 by Purdue University in Lafayette, Indiana, as Bulletin No. 32, pages 22–29.